A## United States Patent [19]

Heady et al.

[11] 3,770,589
[45] Nov. 6, 1973

[54] PROCESS FOR THE PRODUCTION OF GLUCOSE ISOMERASE

[75] Inventors: Robert E. Heady, Park Forest; William A. Jacaway, Jr., Downers Grove, both of Ill.

[73] Assignee: CPC International, Inc., Englewood Cliffs, N.J.

[22] Filed: May 20, 1971

[21] Appl. No.: 145,351

[52] U.S. Cl. .............. 195/66 R, 195/31 F, 195/114
[51] Int. Cl............................................. C12d 13/10
[58] Field of Search ..................... 195/31 F, 61, 62, 195/66, 68, 72, 114

[56] References Cited
UNITED STATES PATENTS
3,622,463   11/1971   Iizuka et al. ...................... 195/31 R OTHER PUBLICATIONS
Danno, G., Agr. Biol. Chem. Vol. 34, p. 1,658–1,667, 1970.
Yoshimura et al., Agr. Biol. Chem. Vol. 30, p. 1,015–1,023, 1966.

Primary Examiner—Alvin E. Tanenholtz
Attorney—Frank E. Robbins, John B. Goodman, Janet E. Price, Joseph Shekleton, Dietmar H. Olesch and Dorothy R. Thumler

[57] ABSTRACT

An improved process for the production of glucose isomerase involves the addition of a specific amount of glycine (aminoacetic acid) to the fermentation medium. This increases the amount of the enzyme, glucose isomerase, that is produced by the microorganism, which preferably is a strain of Streptomyces, most preferably, *S. olivochromogenes* ATCC 21,114. Even further improvement is obtained by also adding a small amount of ammonium nitrate to the culture medium.

5 Claims, 3 Drawing Figures

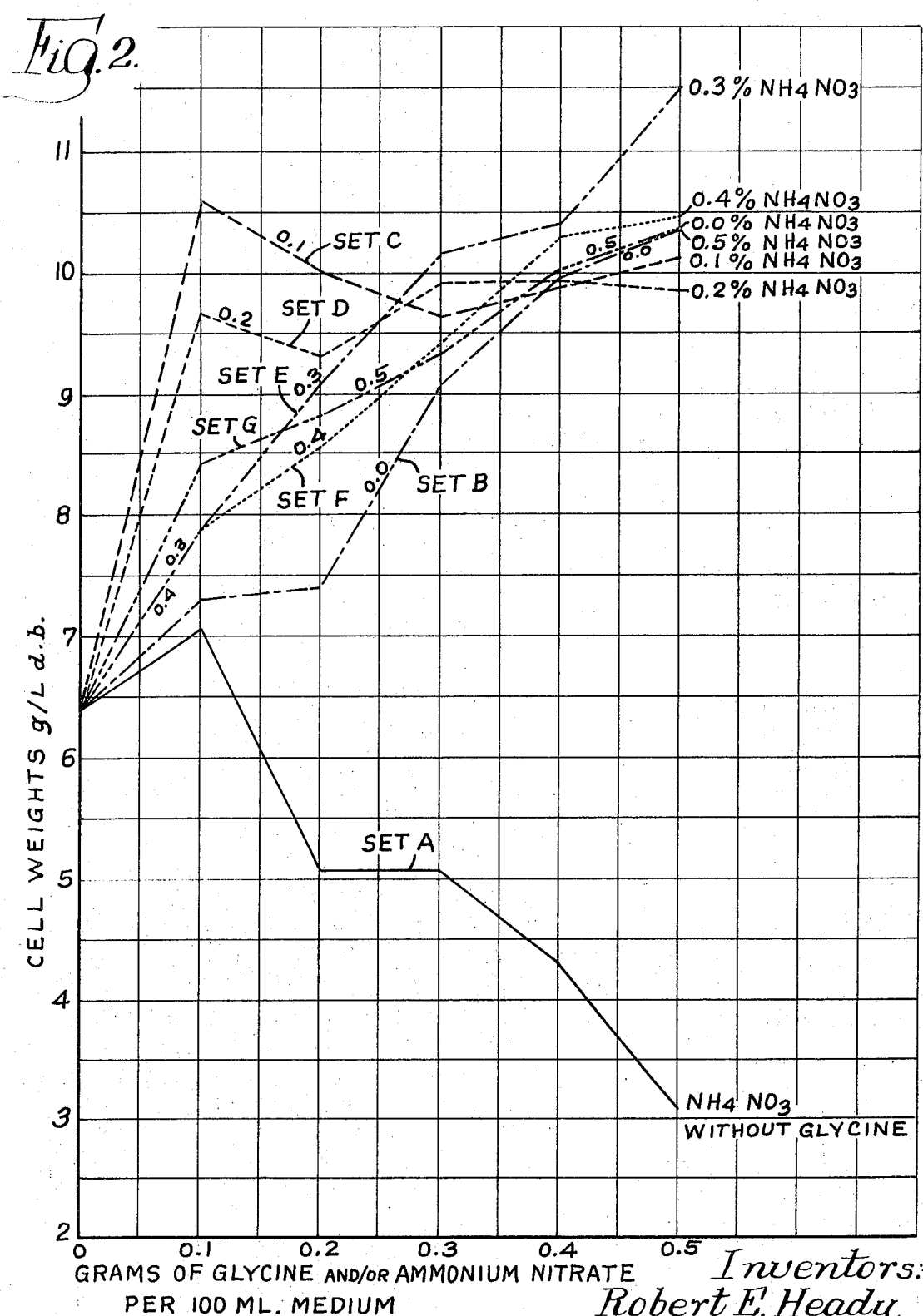

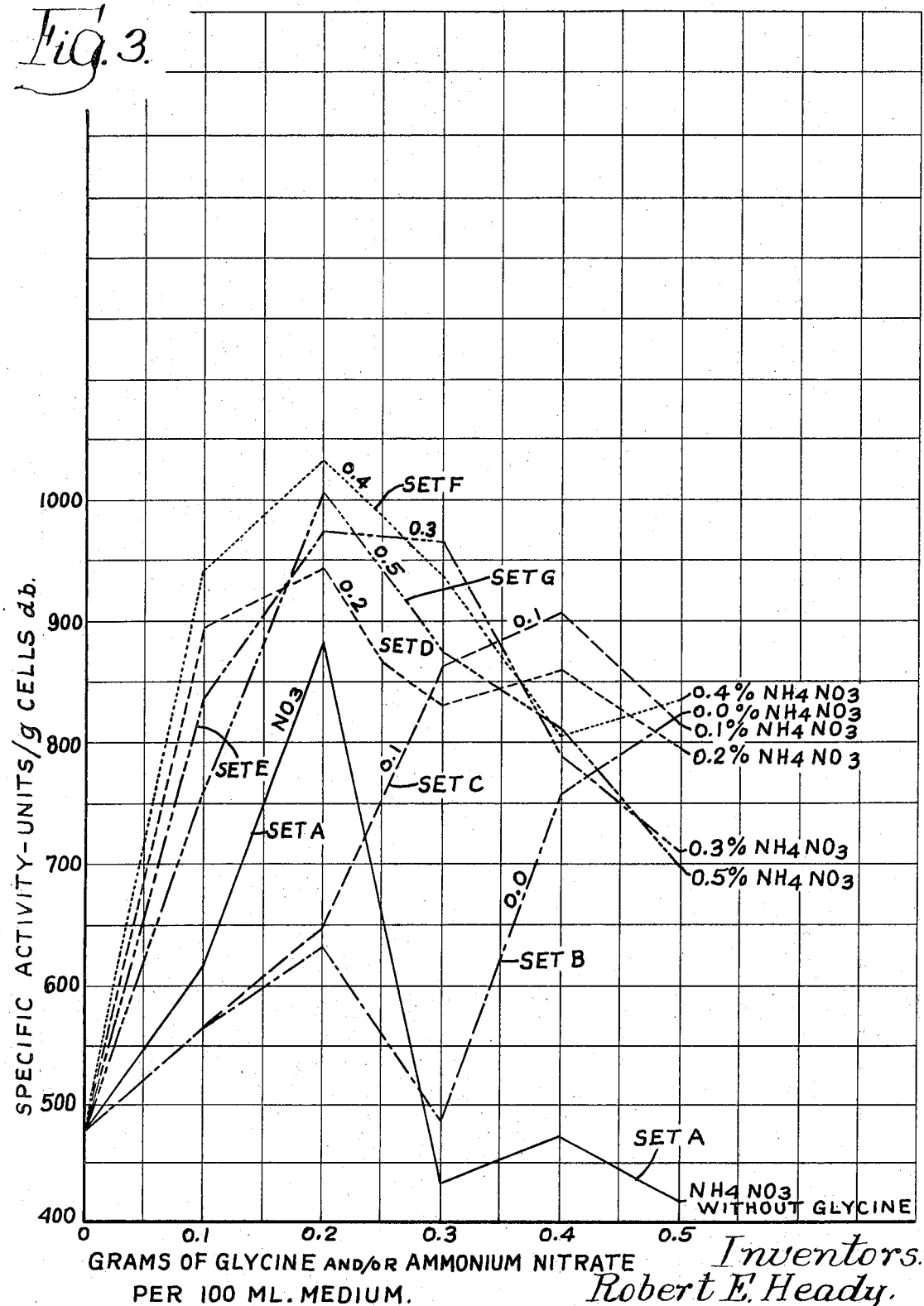

3,770,589

PROCESS FOR THE PRODUCTION OF GLUCOSE ISOMERASE

FIELD OF THE INVENTION

This invention relates to an improved process and culture medium for the production of an enzyme preparation containing glucose isomerase.

DESCRIPTION OF THE PRIOR ART

Since Marshall and Kooi published the information about the first technically feasible dextrose-levulose enzymatic isomerization process in *Science*, Apr. 5, 1957, Vol. 125, No. 3249, pp 648–649, many attempts have been made to develop commercially feasible enzymatic isomerization processes.

OBJECTS OF THE INVENTION

One object of the present invention is to provide an improved process for the production of a glucose isomerase enzyme preparations.

A more specific object of the invention is to provide a practical process for the production of a glucose isomerase enzyme preparation by improving the composition of the culture medium.

A related object of the invention is to provide improved culture media for the growth of microorganisms that produce glucose isomerase.

Other objects of the invention will appear here and after from the specification and from the recitals of the attended claims.

SUMMARY OF THE INVENTION

We have found an improved method for the culture of the cells of microorganisms that produce glucose isomerase enzyme preparations. This method comprises culturing the cells in a medium comprising glycine, in an amount that enhances the production of the enzyme. While this amount may be up to 0.5 g. of glycine per 100 ml. of the culture medium, in practice there is little real advantage to adding an amount of glycine in excess of 0.3 g. per 100 ml. of the culture medium. For the sake of economy, it is preferred that the amount of glycine added to the culture medium be in the range from 0.1 g. to 0.25 g. of glycine per 100 ml. of the culture medium.

In addition, we have discovered that the presence of a small amount of ammonium nitrate in the culture medium produces a synergistic effect with the glycine in enhancing the production of the enzyme. Generally, the amount of ammonium nitrate need not exceed 0.5 g. per 100 ml., although more than this may be used in combination with the glycine, without any material ill effect. However, no real advantage is obtained when the amount of ammonium nitrate present exceeds 0.5 g. per 100 ml., and generally, it is preferred that the amount of ammonium nitrate fall in the range from 0.1 g. to 0.3 g. per 100 ml. of the culture medium.

BRIEF DESCRIPTION OF THE DRAWINGS

In the drawings:

FIG. 2 is a graphical representation of the effects of additions of glycine, of ammonium nitrate, and of combinations of glycine and ammonium nitrate, to the culture medium, on cell production in terms of cell weights in grams per liter, dry basis, and FIG. 3 is a graphical representation of the effects of additions of glycine by itself, of ammonium nitrate by itself, and of combinations of glycine and of ammonium nitrate together, to the culture medium, in terms of the specific activity as measured in units of isomerase per gram of cells, dry basis.

GENERAL DESCRIPTION OF THE INVENTION

Figure 1:
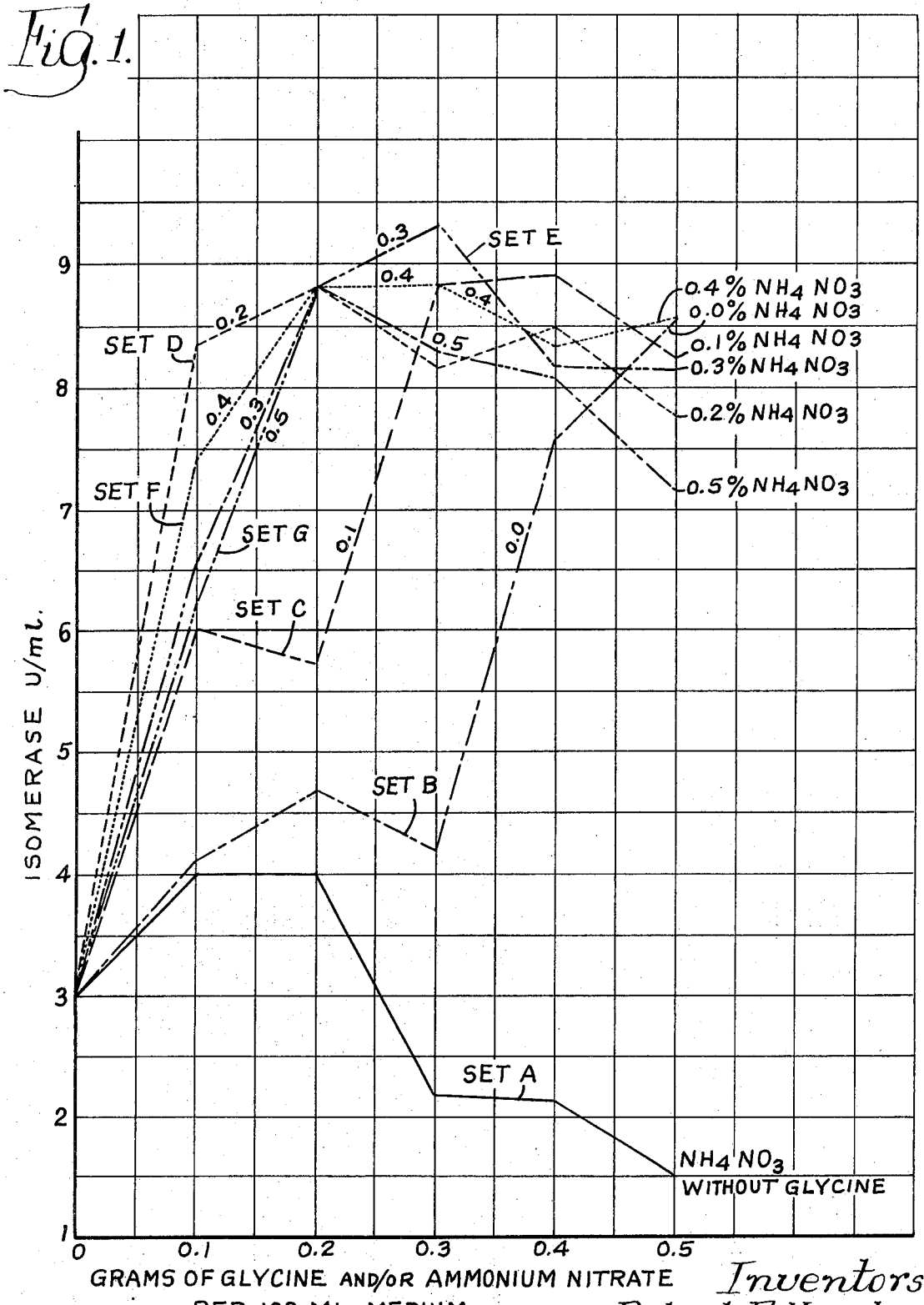
FIG. 1 is a graphical representation showing the effects of additions of glycine by itself, of ammonium nitrate by itself, and of combinations of glycine and ammonium nitrate at different rates of addition, to a particular culture medium, in terms of enzyme production in units per ml. of culture medium, in accordance with one embodiment of the present invention.

The process of the present invention can be employed, so far as is known, for the production of all types of glucose isomerase enzyme preparations, including those where the enzyme preparation has a dominant or more rapid catalytic action on an isomerization other than that of glucose to levulose. These enzyme preparations can be derived from a large number of different microbial sources.

Each enzyme preparation seems to have its own particular characteristics, such as, for example, optimum pH, optimum temperature, the required metal ions, Michaelis constant, and the mechanism of levulose formation, all of which seem to be somewhat different from one enzyme preparation to another. However, the process of the present invention seems to be applicable to the production of glucose isomerase enzyme preparations from all known microbial sources, and more specifically, from all Streptomyces species and strains and all Bacillus species and strains that produce glucose isomerase enzyme preparations.

Generally, a glucose isomerase enzyme preparation is produced by growing, in a culture medium containing one or more suitable carbon sources that induce production of the enzyme, a microorganism that is capable of producing the enzyme, and then allowing the enzyme to be formed by the organism. The organism employed is, preferably, a microorganism of the bacterial or fungal type.

Particularly preferred microorganisms are the members of the Streptomyces genus. Particularly preferred species among this genus are *S. venezuelae* and *S. olivochromogenes*. Cultures of preferred strains of these organisms have been deposited in the American Type Culture Collection, Washington, D.C., and added to its permanent collection of microorganisms. They have been assigned the following identification: *S. venezuelae* ATCC 21,113 and *S. olivochromogenes* ATCC 21,114.

The enzyme preparation is produced in the usual manner. An inoculum prepared, for example, on an agar slant, is used to inoculate a flask containing a suitable inoculum development medium. Thus, for example, a culture containing a Streptomyces strain, that is capable of producing a glucose isomerase enzyme preparation, is utilized to inoculate an inoculum development substrate containing an appropriate carbon source. The organism is allowed to grow in the inoculum development medium. The incubation period may fall within a wide period of time, depending upon the particular microorganism strain that has been selected, and, as well, on the particular inoculum development medium that is utilized. Generally, the incubation period may last from about 4 to about 48 hours. In the usual case, an aliquot, or the entire culture, is then utilized to inoculate a still larger volume of culture medium or nutrient. This may be repeated one or more times, as necessary. The final culture, which is grown in a medium specifically formulated to induce enzyme production, is then used as the source of enzyme, with or without purification procedures, to effect the isomerization of glucose to levulose.

The carbon source in the culture media may be xylose, a mixture of xylose and starch, or xylose in combination with other carbon sources such as, for example, mannitol, gluconic acid, galactose, glycerin, sorbitol, glucose, and other pure or impure sources of carbohydrates.

The xylose portion of the culture media may be xylose itself or its native forms that exist in cell walls of almost all plants in the form of the xylan polymer of xylose, which contains xylose as its main constituent. Thus straw, chaff, wood, corn cobs, wheat bran, and the like may be employed as the source of xylan. Ordinarily, these materials are treated with alkali to extract the xylose polymer.

A preferred source of carbon in the culture media is a mixture composed of 25 to 75 percent by weight of starch and 75 to 25 percent by weight of xylose, based on the combined weight of these two materials. Expressed in a different manner, the carbon source comprising the mixture of these two materials preferably comprises from 0.2 g. to 10 g. per 100 ml. of the culture medium. More preferably, the mixture of these two materials comprises from 0.5 g. to 3 g. per 100 ml. of the culture medium.

A preferred protein source, in the culture media, is corn steep liquor. A very desirable culture medium can be made up that includes from 0.1 g. to 5 g. of corn steep liquor for every 100 ml. of the culture medium.

The culture media may also contain, in addition to the carbon source, materials such as, for example, inorganic salts such as magnesium sulfate, potassium dihydrogen phosphate, and the like.

The addition of glycine, with or without the addition of ammonium nitrate, is beneficial at each stage in the propagation of the microorganism. Moreover, the addition is beneficial with all known culture media compositions. Exemplary compositions for use in propagating microorganisms of the Streptomyces genus, that can be improved by the use of the present invention, would include the following representative compositions:

TABLE I

MEDIUM COMPOSITIONS

Medium I — Slant Medium for Culture
Maintenance

| | g/liter |
|---|---|
| Xylose | 10 |
| Yeast Extract (Difco) | 1 |
| Beef Extract (Difco) | 1 |
| Bacto-tryptone (Difco) | 2 |
| Agar | 20 |
| $CoCl_2·6H_2O$ | 0.24, when used |

Medium II — Inoculum Development Medium

| | g/liter |
|---|---|
| Xylose | 5 |
| Corn Starch | 5 |
| Corn Steep Liquor (as is) | 40 |
| MgSO 7H O | 0.5 |
| CoCl 6H O (optional) | 0.24 ($10^{-3}$M) |

(pH adjusted to 7.1 prior to sterilization)

Medium III — Fermentation Medium

| | g/liter |
|---|---|
| Xylose | 10 |
| Corn Starch | 10 |
| Corn Steep Liquor, as is | 40 |
| $MgSO_4·7H_2O$ | 0.5 |
| $CoCl_2·6H_2O$ (optional) | 0.24 ($10^{-3}$M) |

(pH adjusted to 7.1 prior to sterilization)

DETAILED DESCRIPTION OF THE INVENTION

The following examples provide several demonstrations of the manner in which the present invention may be practiced. All references to parts and to percentages are by weight, unless expressly indicated to be otherwise, and are on an "as is" basis unless expressly stated to be on a dry or other basis.

EXAMPLES

Production Of Glucose Isomerase Enzyme Preparation From *Streptomyces olivochromogenes* ATCC 21,114 And The Effects Of Glycine In The Culture Medium These examples represent practice of the present invention in accordance with one preferred mode thereof.

A. Inoculum Development

Spores from a slant of *Streptomyces olivochromogenes* ATCC 21,114 were inoculated into several 500 ml. Erlenmeyer flasks each containing 100 ml. quantities of a sterile medium composed of the ingredients described below in Table II.

TABLE II

| Ingredients | Amounts |
|---|---|
| Xylose | 5.0 g. |
| Corn Starch | 5.0 g. |
| Corn Steep Liquor (as is) | 40.0 g. |
| Magnesium Sulfate ($MgSO_4·7H_2O$) | 0.5 g. |
| Cobalt Chloride ($CoCl_2·6H_2O$) | 0.24 g. |
| Distilled Water | 1000 ml. |

The pH of the culture medium was adjusted to 7.1 with sodium hydroxide prior to sterilization. The flasks were inoculated and incubated for 60 hours at a temperature in the range from about 28°C. to about 30°C. on a reciprocating shaker.

B. Production of the Enzyme Preparation

Into each of several 1,000 ml. Hinton modified Erlenmeyer flasks was placed a quantity of 200 ml. of sterile medium of the following composition:

TABLE II

| Ingredients | Amounts |
|---|---|
| Xylose | 10.0 g. |
| Corn Starch | 10.0 g. |
| Corn Steep Liquor | 40.0 g. |
| Brewers' Yeast Extract | 2.5 g. |
| Magnesium Sulfate ($MgSO_4·7H_2O$) | 0.5 g. |
| Cobalt Chloride ($CoCl_2·6H_2O$) | 0.24 g. |
| Distilled Water | 1000 ml. |

The pH was adjusted to 7.1 with sodium hydroxide prior to sterilization.

In preparing either of the media described above, xylan hydrolysate can be used in place of xylose with substantially equivalent results. The hydrolysate is an inexpensive source of xylose.

The culture media in six of the flasks (Set A in the drawings) were then treated in the following way. To a first flask, nothing was added. To the other five, ammonium nitrate was added, in the following quantities, respectively: 0.1; 0.2; 0.3; 0.4, and 0.5 g., per 100 ml. of the culture medium.

The culture media in a second set of six flasks (Set B in the drawings) were also modified, in the following way. To the first flask, nothing was added. Amounts of glycine in the following quantities were then added to the remaining five flasks, respectively: 0.1; 0.2; 0.3; 0.4, and 0.5 g., per 100 ml. of the culture medium.

Set C: The procedure followed in preparing the Set B flasks was followed with respect to the addition of glycine to the six flasks of Set C. Then, to each of these six flasks, 0.1 g. of ammonium nitrate was added for each 100 ml. of culture medium.

Set D: The procedure followed in preparing the Set B flasks was again followed. Then to each of these flasks of Set D, 0.2 g. of ammonium nitrate was added for each 100 ml. of culture medium.

Set E: Another set of six flasks was set aside and identified as Set E. The procedure used in preparing the Set B flasks was again followed, then 0.3 g. of ammonium nitrate was added to each flask for each 100 ml. of culture medium therein, respectively.

Set F: This set of flasks was prepared in the same manner as Set E, but the addition of ammonium nitrate to each flask in the set was 0.4 g. for each 100 ml. of culture medium.

Set G: This set of six flasks was prepared in the same manner as the six flasks of Set F, except that the addition of ammonium nitrate to each flask was in the amount of 0.5 g. of ammonium nitrate for each 100 ml. of culture medium in each flask.

The contents of the several inoculum flasks were then blended together and mixed to insure homogeneity. Aliquot portions of 10 ml. each were then taken from the mixture. These aliquots were then used to inoculate each of the flasks in each of the sets that were prepared as just described. The inoculated flasks were then incubated for 48 hours at a temperature in the range from about 28°C. to about 30°C. on a rotary shaker.

C. Harvesting of the Enzyme Preparation

After fermentation, an aliquot from each flask was centrifuged at 10,000 times gravity for 15 minutes. The centrifugate was decanted off and the cell pack saved for assay. The cell pack was either assayed immediately or, alternately, was stored frozen until assayed.

D. Solubilization of Enzyme

Immediately prior to assay, the cell pack was brought back to its original volume with 0.05 molar potassium phosphate buffer (pH 7.5), and the cells were resuspended. The reconstituted cell pack was then sonicated at 0°–5°C for 1.5 – 2.0 minutes with the aid of a Branson Model W–185D Sonifier operating at a setting of 80 watts.

The isomerase activity of the sonicated cells was then determined by the following procedure.

E. Assay of Isomerase Activity

The assay procedure involved making a spectrophotometric determination of the ketose produced from a glucose solution under a standarized set of conditions.

A stock solution was made up in the following manner:

TABLE III

| Component | Amount |
| --- | --- |
| 0.1 M MgSO$_4$ · 7H$_2$O | 1 ml. |
| 0.01 M CoCl 2 · 6H$_2$O | 1 ml. |
| 1 M Phosphate Buffer, pH 7.5 | 0.5 ml. |
| Anhydrous D-Glucose | 1.44 g. |
| Distilled Water | To make up a total volume of 7.5 ml. |

The solubilized enzyme preparation to be assayed was first diluted to contain from 1 to 6 isomerase units per ml.

The enzymatic isomerization was conducted by adding 1 ml. of the enzyme preparation to 3 ml. of the stock solution, and incubating for 30 minutes at 60°C. At the end of the incubation period, a 1 ml. aliquot was taken and quenched in a 9 ml. volume of 0.5 N perchloric acid. The quenched aliquot was the diluted to a total volume of 250 ml. As a control, for comparative purposes, a glucose blank was also run by substituting 1 ml. of water for the 1 ml. of the enzyme preparation in solution form, at the beginning of the incubation period.

The ketose was then determined by a cysteine-sulfuric acid method. For the purposes of this assay, one isomerase unit is defined as the amount of enzyme activity that is required to produce one micromole of levulose per minute under the isomerization conditions described.

F. Tabular Presentation of the Results

TABLE IV

EFFECTS OF GLYCINE AND AMMONIUM NITRATE ON THE PRODUCTION OF ISOMERASE BY *Streptomyces olivochromogenes*

| GLYCINE, grams/100 ml. | 0.0 | 0.1 | 0.2 | 0.3 | 0.4 | 0.5 |
| --- | --- | --- | --- | --- | --- | --- |
| Ammonium Nitrate, gram/100 ml. | ISOMERASE YIELD, UNITS/ml. | | | | | |
| 0.0 | 3.0 | 4.1 | 4.7 | 4.2 | 7.6 | 8.5 |
| 0.1 | 4.0 | 6.0 | 5.8 | 8.8 | 8.9 | 8.2 |
| 0.2 | 4.0 | 8.3 | 8.8 | 8.2 | 8.5 | 7.7 |
| 0.3 | 2.2 | 6.5 | 8.8 | 9.3 | 8.2 | 8.1 |
| 0.4 | 2.1 | 7.4 | 8.8 | 8.8 | | 8.5 |
| 0.5 | 1.5 | 6.3 | 8.8 | 8.3 | 8.1 | 7.1 |
| | DRY CELL WEIGHT, GRAMS/LITER | | | | | |
| 0.0 | 6.4 | 7.3 | 7.4 | 9.1 | 10.0 | 10.3 |
| 0.1 | 7.0 | 10.6 | 10.0 | 9.6 | 9.8 | 10.1 |
| 0.2 | 5.1 | 9.6 | 9.3 | 9.9 | 9.9 | 9.8 |
| 0.3 | 5.1 | 7.9 | 9.1 | 10.1 | 10.4 | 11.5 |
| 0.4 | 4.3 | 7.9 | 8.5 | 9.4 | 10.3 | 10.4 |
| 0.5 | 3.1 | 8.4 | 8.8 | 9.3 | 10.0 | 10.3 |
| | SPECIFIC ACTIVITY, UNITS/GRAMS DRY CELL | | | | | |
| 0.0 | 470 | 570 | 630 | 490 | 760 | 820 |
| 0.1 | 610 | 570 | 640 | 860 | 900 | 810 |
| 0.2 | 880 | 890 | 940 | 830 | 860 | 790 |
| 0.3 | 430 | 840 | 970 | 960 | 790 | 710 |
| 0.4 | 470 | 940 | 1030 | 940 | 810 | 830 |
| 0.5 | 420 | 760 | 1000 | 870 | 810 | 700 |

G. Graphical Representation of the Results

For better visualization and ease of comparison, the data of Table IV is presented graphically in the drawings.

In FIG. 1., each plotted line represents a constant content level of ammonium nitrate. Each plotted point along the Set A line represents the concentration of added ammonium nitrate. Each plotted point along each other line represents the concentration of glycine that has been added to the culture medium.

Thus, for example, the plotted line for Set A represents 6 different levels of ammonium nitrate addition, beginning with zero and ending with 0.5 g. per 100 ml. of culture medium, without any glycine addition at all. The plotted line for Set B records the effects of different levels of glycine addition, in the absence of any addition of ammonium nitrate. The plotted lines for Sets C through G, inclusive, illustrate the effects of different levels of ammonium nitrate addition at different enrichment levels of glycine.

As the plotted lines in FIG. 1 demonstrate, the addition of ammonium nitrate alone produces a slight stimulatory effect on the production of isomerase, up to a concentration of about 0.2 g. of the ammonium nitrate for each 100 ml. of culture medium. Above this level, the ammonium nitrate addition appears to depress the production of the enzyme.

On the other hand, the addition of glycine appears to enhance enzyme production when used at all the levels of addition recorded in FIG. 1.

The combination of the ammonium nitrate and of the glycine exhibit synergisn, as demonstrated in FIG. 1, in a manner that is totally unexpected.

The economic advantage of this synergistic action is substantial, since the addition of ammonium nitrate reduces the amount of glycine that must be added to produce a given enhancement in the enzyme production. Since ammonium nitrate is very much less expensive than glycine, there is a definite economic incentive for use of the synergistic combination rather than just the glycine alone.

FIG. 2 is a graphical illustration of the effect of the additions of glycine and of ammonium nitrate on the growth of the microorganism. It appears that the addition of the ammonium nitrate alone exhibits a toxic effect on the growth of the microorganism, at least at concentrations above 0.1 g. per 100 ml. of the culture medium. As shown by the plotted line for Set B, the addition of glycine alone enhances the production of cells.

The addition of both glycine and ammonium nitrate exhibits a synergistic effect on the production of cells, as is shown by the plotted lines for Sets C through G inclusive. This synergistic effect on cell growth is most marked at low levels of addition of the salt and of the amino acid. The markedly enhanced growth rate also may be achieved by the addition of higher concentrations of glycine alone.

FIG. 3 is a graphical representation of the effect of the additives on the units of the isomerase enzyme per gram of cells of the microorganism, on a dry basis. This figure demonstrates that although the cell growth is stimulated by the addition of glycine and of ammonium nitrate, the production of the enzyme is enhanced to an even greater degree. This is an important and an unexpected finding, of great economic significance.

Comparable results are obtained when the microorganism employed is Streptomyces venezuelae ATCC 21,113.

FURTHER EXAMPLES

Production of Glucose Isomerase Eznyme Preparation from other Streptomyces Strains and the Effects of Glycine in the Culture Medium Fermentations were conducted with several species of Streptomyces. The medium contained:

TABLE V

| Ingredients | Amounts, g/l |
|---|---|
| Xylose | 20 |
| 15 D.E. corn syrup solids | 10 |
| Corn steep liquor (as is) | 36 |
| Magnesium sulfate (MgSO₄·7H₂O) | 0.5 |

Following generally the procedures already described, the data that is presented below in Table VI was observed.

TABLE VI

| Microorganism | Glycine added, g/100 ml | | | |
|---|---|---|---|---|
| | 0 | 0.1 | 0.2 | 0.3 |
| St. olivochromogenes ATCC 21,114 | | | | |
| Isomerase yield, u/ml | 2.2 | 3.0 | 3.1 | 3.6 |
| Cell wt., g/l | 6.7 | 6.8 | 7.5 | 7.7 |
| Sp. act., u/g | 330 | 440 | 410 | 470 |
| St. phoechromogenes NRRL B 2119 | | | | |
| Isomerase yield, u/ml | 1.3 | 2.4 | 3.0 | 4.1 |
| Cell wt., g/l | 4.6 | 7.2 | 8.4 | 9.3 |
| Sp. act., u/g | 280 | 320 | 360 | 440 |
| St. griseoruber | | | | |
| Isomerase yield, u/ml | 1.1 | 1.5 | 1.8 | 2.5 |
| Cell wt., g/l | 6.6 | 7.7 | 8.4 | 9.2 |
| Sp. act., u/g | 170 | 190 | 220 | 270 |

GENERAL

The economic advantage of the present invention is very substantial. The cost of the culture medium for an industrial scale fermenter may be several thousand dollars. The cost of adding enough glycine to have the effect of doubling the yield of isomerase is a small fraction of the total medium cost, but can double the enzyme yield.

We have found that when the amount of glycine that is added to the culture medium is in an amount equivalent to an addition rate of 0.1 g. to 0.25 g. for each 100 ml. of culture medium, the recovery of isomerase enzyme is increased from 1½ to 2 times. An increase in the overall amount of microbial cells produced is also observed, but the increase is not on the same order of magnitude as the increase in enzyme production.

The amount of glycine added may be in excess of an amount equivalent to 0.25 g. for each 100 ml. of culture medium. Thus, the addition of an amount equal to 0.5 g. of glycine for each 100 ml. of culture medium will produce more microbial cells than will a 0.25 per g. per 100 ml. addition. However, the increased amount of enzyme produced will be less than that produced in the culture medium when a smaller amount of glycine is added. Moreover, it has been found that when the rate of glycine addition is equivalent to 1.0 g. per 100 ml. of culture medium, growth inhibition occurs and the recovery of enzyme is less than that at a rate of glycine addition equivalent to 0.5 g. per 100 ml. of culture medium.

Although certain other amino acids do have some stimulating effect on production of enzyme, the effect is generally subtantially less than that obtained with glycine, or requires so much of the amino acid as to be impractical.

The addition of glycine to the culture medium, either alone or in combination with ammonium nitrate, appears to be generally useful for enhancing isomerase production with all known microorganisms that produce the isomerase. Thus, the demonstrations of the invention that have been described can be substantially duplicated with other strains of Streptomyces, such as, for example, S. venezuelae ATCC 21,113. Enhanced enzyme production can also be obtained through the use of glycine in the culture medium, with or without the addition of ammonium nitrate, in the production of many other Streptomyces species. For example, the following are representative:

| | |
|---|---|
| S. achromogenus | S. griseolus |
| S. albus* | S. griseoruber |
| S. antibioticus ATCC 10,332 | S. griseus |
| S. aureus | S. herbaricolor |
| S. bobiliae | S. hydroscopicus |
| S. californicus | S. lipmani |
| S. coelicolor | S. niveoruber |
| S. diastaticus | S. olivaceus |
| S. flavovirens | S. phaeochromogenes* |
| S. fradiae | S. purpeofuscus |
| S. gaelicolor | S. rockei |
| S. galbus | S. roseochromogenes |
| S. galilaeus | S. rutgersensis |

| S. gedanensis | S. vinaceus |
| | S virginiae  *Strains obtained from USDA Laboratories, Peoria, Ill. |

In addition, many different soil isolates produce the desired enzyme. The present invention is efficacious for use with such microorganisms, and, as well, with such other diverse enzyme-producing producing organisms as: *Pasteurella pestis; Lactobacillus pentosus; L. brevis; L. gayonii; L. fermenti; L. pentoaceticus; L. fermentum; L. lycopersici; L. buchneri;* and *L. xylosus;* strains of Bacillus isolated from laboratory air; *B. megaterium; Aerobacter cloacae; A. aerogenes; Candida utilis; Escherichia intermedia; Micromonospora; Mycobacterium phylei; M. Smegmatis; Actinomyces fluorescens; Brevibacterium Pentoso Aminoacidicum;* and *Leuconostic mesenteroides.*

In addition, enhanced enzyme production is also observed by using the techniques of the present invention in the culture of thermophilic Bacilli, particularly *Bacillus stearothermophilus.*

Enzymes produced in accordance with the present invention are useful, of course, in the production of levulose-bearing products from starch hydrolyzates and dextrose solutions.

CONCLUSION

While the invention has been described in connection with specific embodiments thereof, it will be understood that it is capable of further modifications, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

We claim:

1. A method for the culture of microorganisms which produce glucose isomerase comprising culturing said microorganisms in a medium comprising from 0.1 g. up to 0.5 g. of glycine/100 ml. of culture medium, from 0.1 g. up to 0.5 g. of ammonium nitrate/100 ml. of culture medium and xylose as a carbon source.

2. The method of claim 1 wherein the microorganism is a Streptomyces microorganism.

3. The method of claim 1 wherein the microorganism is *Streptomyces olivochromogenes* ATCC 21,114.

4. The method of claim 1 wherein the microorganism is *Streptomyces venezuelae* ATCC 21,113.

5. The method of claim 1 wherein the culture medium contains from 0.2 g. to 10 g./100 ml. of culture medium of a mixture composed of 25 to 75 percent by weight of starch and 75 to 25 percent by weight of xylose.

* * * * *